March 24, 1931. P. MALACOS 1,798,093
AIRPLANE
Filed March 27, 1930 2 Sheets-Sheet 1

Inventor
Peter Malacos
By Wilkinson & Mawhinney
Attorneys.

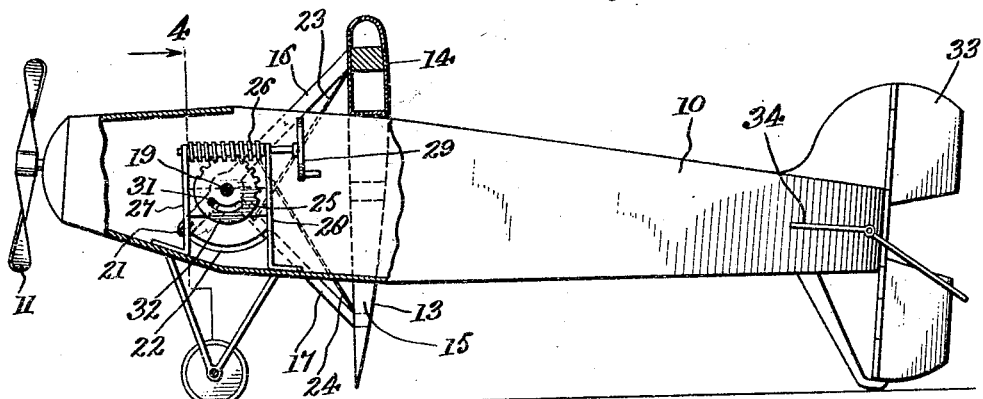
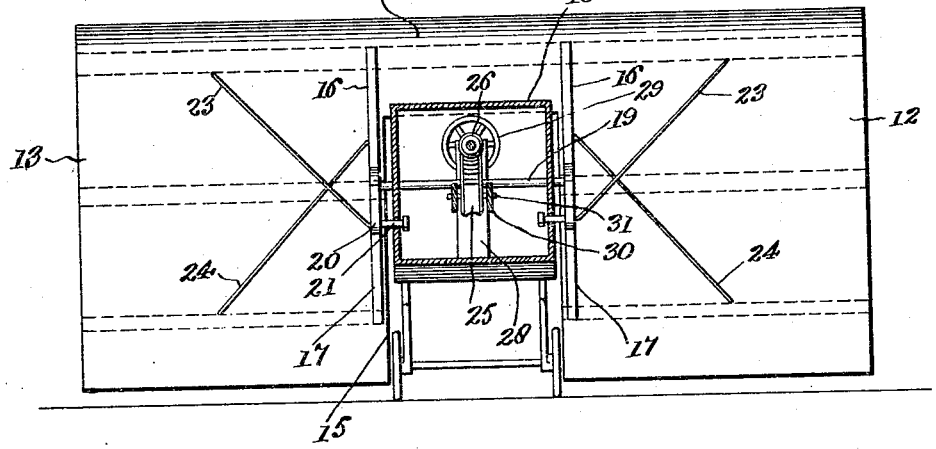
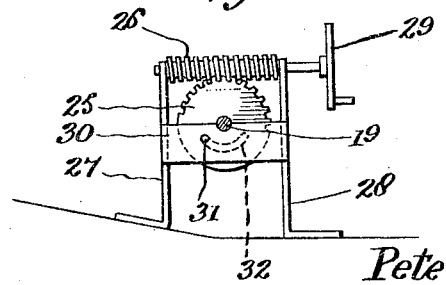

Patented Mar. 24, 1931

1,798,093

UNITED STATES PATENT OFFICE

PETER MALACOS, OF GALVESTON, TEXAS

AIRPLANE

Application filed March 27, 1930. Serial No. 439,440.

The present invention relates to improvements in airplanes, and more particularly refers to an adjustable wing structure for airplanes.

An object of the invention is to provide an improved airplane, in which the sustaining wings or planes may be made to shift about the body or fuselage throughout a wide range whereby to bring the planes to a substantially horizontal position during flight, or to an approximate perpendicular position for acting as a brake to stop the plane, or for acting as a check, should the plane nose-dive and get out of control.

The invention also contemplates improved means whereby the angular adjustment of the planes may be effected.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of an improved airplane constructed according to the present invention, Figure 2 is a top plan view of the same, Figure 3 is also a side view of the improved airplane with parts broken away, and the wing tilted back to the perpendicular position.

Figure 4 is a cross section along the lines 4—4 in Figure 3, and

Figure 5 is an enlarged view of the angle setting device apart from the airplane.

Figure 1:
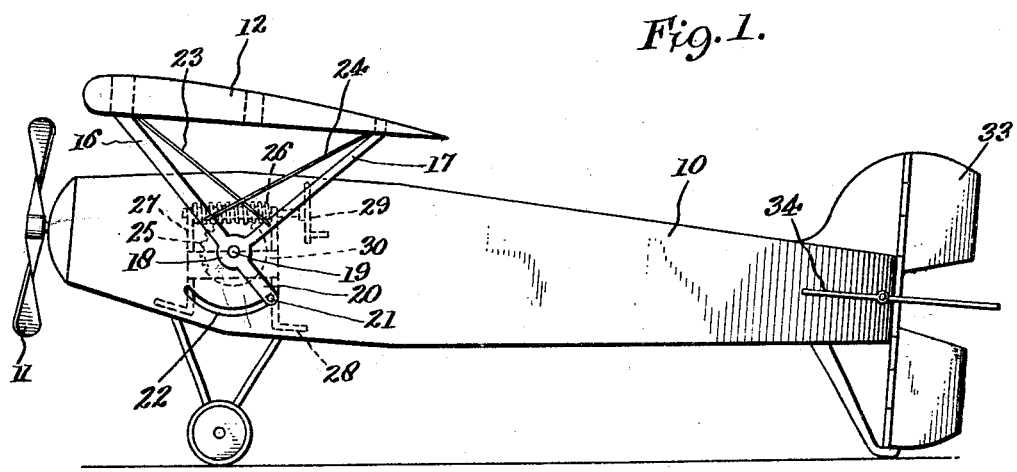

Referring more particularly to the drawings, 10 designates generally the body or fuselage of the airplane; and 11 represents the propeller mounted at the forward portion of the airplane and driven by an appropriate motor in accordance with the usual practice.

In accordance with the invention, two planes 12 and 13 are mounted at opposite sides of the airplane body and above the same. These two planes extend in alignment with one another, preferably in accordance with the monoplane type; such planes 12 and 13 being preferably connected by an intermediate portion 14, which, however, extends between the planes only at the forward portions thereof, leaving a gap or slot 15 between the rear portions of the planes for receiving the body 10 when the planes or wings are shifted back to a substantially perpendicular position, as shown in Figure 3.

The wings or planes 12 and 13 are braced by the forward and rear braces 16 and 17, such braces being connected at their upper ends, respectively, to the forward and rear portions of the planes. Such braces also intersect at their lower ends, where they are provided with enlarged bearing portions 18 fixedly connected with a transverse axle or shaft 19 mounted in the side walls of the airplane body 10. The diagonal braces 16 are preferably extended beyond the bearing portions 18, as indicated at 20, and these extension portions 20 carry pins 21 projecting inwardly of the airplane and into arcuate slots 22 made in the side walls of the body 10.

The planes or wings and the triangular structure of the braces 16 and 17, which form a rigid truss construction, are further reinforced by the wire braces 23 and 24. The upper ends of the wires are connected with the planes, and such wires intersect, and cross one another above the points of intersection of the brace arms 16 and 17. The forward brace wire 23 is secured to the rear brace arm 17 above the intersecting point 18 of the arms; while the rear brace wire 24 is coupled to the forward brace arm 16 also above the intersecting point 18. The result is an extremely strong construction reinforced against all lateral and longitudinal strains. Such strength is necessary, especially where the planes or wings are made to assume the perpendicular position shown in Figure 3, and extend, for purposes of acting as a brake, at approximately right angles to the direction of flight.

Figure 2:
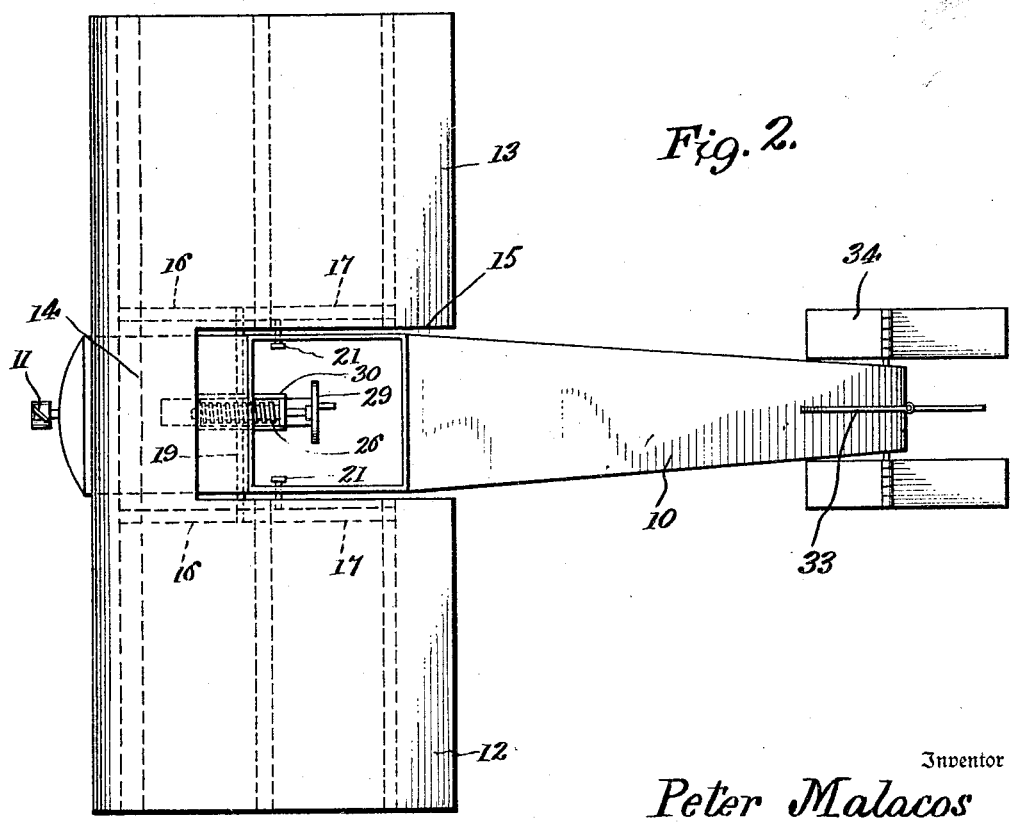

The shaft 19 fixedly carries at its central portion a worm wheel 25 disposed in mesh with an overhead worm 26 journalled for rotation in brackets 27 and 28 carried within the airplane. The worm 26 may be supplied with a wheel 29 for facility in turning. Between the brackets 27 and 28 extend webs 30, carrying pins 31 projecting inwardly and into a curvilinear slot 32 made in the worm wheel 25. The pins 21, as shown in Figures 2 and 4, are preferably headed interiorly of the airplane body.

At the rear of the airplane are provided the vertical and horizontal rudders 33 and 34. These rudders are to answer the purpose of governing the aircraft, and it will be noted that these rudders extend to a low point, enabling the rudders to have control of the aircraft at the time that the wings are in a perpendicular position, as indicated in Figure 3. With the old construction, the wings in the perpendicular position will cover the upper part of the rudders and so with the lower part in extending to a low point. As provided by my invention, this downwardly extending portion will take the place of the upper parts of the rudders.

In the operation of the device, the wings will assume the position indicated in Figure 1, when the airplane is in normal flight. When the airplane is to be stopped, the wings may be moved by manipulating the hand wheel 29 to the position shown in Figure 3, or the wings extend at right angles to the line of flight and thus act as a brake to quickly stop the airplane, and permit it to descend. By rotating the hand wheel 29, the worm 26 and worm wheel will rotate, communicating motion to the shaft 19, and thus to the wings through the brace arms. Where the wings are moved to an intermediate position between the horizontal position shown in Figure 1 and the vertical or perpendicular position shown in Figure 3, they will act to lift the airplane in a very small space. After rising, the wings are moved to the position shown in Figure 1 to enable the airplane to proceed at a fast rate of speed.

The wings may be placed at any degree of angle for the purpose of lifting, sustaining or stopping the airplane.

If the airplane should meet with an accident, and become disabled, developing a tendency to nose-dive, the wings may be put in the perpendicular position, and they will act as a parachute, causing the plane to land slowly and safely. Preferably the wings 12 and 13 are of great spread, so that they may perform the several functions assigned them. Preferably the wings are twice as wide as those now constructed, although not so long. In this way, the wings are more flexible, and better control is secured.

The arms 16 and 17 may be closed completely across same if desired, and the rudder structure may also be closed completely.

It will be obvious that many changes in the construction, combination and arrangement of parts could be made, which could be used without departing from the spirit of my invention, and I do not mean to limit the invention to such details, except as particularly pointed out in the claims.

Having thus described my invention, what I claim and desire to secure by Letters Patent of the United States is:—

1. An improved airplane comprising a body, a shaft journalled transversely through the body, a slotted worm wheel fixed on the shaft, a worm meshing with said worm wheel, brackets supporting said worm having webs extending therebetween with pins projecting through the slotted portions of the worm wheel, braces fixedly carried by the outer portions of said shaft, and wings carried by said braces.

2. An improved airplane comprising a body portion, a shaft journalled transversely through the forward part of the body portion, wings extending above and to the sides of said body, intersecting braces carrying said wings and affixed to said shaft, means for rotating said shaft, and brace wires coupled at the upper portions to forward and rear parts of the wings and at the lower ends to the brace arms above said shaft, said wires intersecting above the points of intersection of said arms.

3. An improved airplane comprising a body, connected wings extending above and to the sides of the body, diagonal brace arms connected to forward and rear portions of the wings and intersecting at their lower ends, bearing portions in the lower intersecting parts of the braces, a transverse shaft journalled through the body receiving such bearing portions, a slotted worm wheel fixed on the intermediate part of the shaft, a worm meshing with said worm wheel for adjusting the angular portions of the wings, and brackets supporting said worm having webs extending therebetween with pins projecting through the slotted portions of the worm wheel.

4. An improved airplane comprising a body, a transverse shaft journalled through the body, a slotted worm wheel fixed on the shaft, means for rotating said wheel, brackets supporting said means having webs extending therebetween with pins projecting through the slotted portions of the worm wheel, and wings mounted on said shaft.

PETER MALACOS.